US008652319B2

(12) United States Patent
Kothe et al.

(10) Patent No.: US 8,652,319 B2
(45) Date of Patent: Feb. 18, 2014

(54) SYSTEM AND METHOD FOR SPLITTING WATER

(75) Inventors: Walter Kothe, Feldkirchen (DE); Harald Adam, Serba (DE); Dieter Gruetzmann, Stadtroda (DE)

(73) Assignee: Walter Kothe, Feldkirchen (DE)

(*) Notice: Subject to any disclaimer, the term of this patent is extended or adjusted under 35 U.S.C. 154(b) by 1003 days.

(21) Appl. No.: 12/280,021

(22) PCT Filed: Feb. 19, 2007

(86) PCT No.: PCT/EP2007/001425
§ 371 (c)(1),
(2), (4) Date: Aug. 20, 2008

(87) PCT Pub. No.: WO2007/096120
PCT Pub. Date: Aug. 30, 2007

(65) Prior Publication Data
US 2009/0026089 A1 Jan. 29, 2009

(30) Foreign Application Priority Data

Feb. 20, 2006 (DE) .......................... 10 2006 007 773

(51) Int. Cl.
*C25B 1/04* (2006.01)

(52) U.S. Cl.
USPC ............................ 205/628; 204/242; 204/278

(58) Field of Classification Search
USPC ........... 205/742, 746, 628; 429/418; 204/242, 204/278
See application file for complete search history.

(56) References Cited

U.S. PATENT DOCUMENTS

| 3,262,872 | A | | 7/1966 | Rhodes et al. |
| 3,310,483 | A | | 3/1967 | Rhodes |
| 4,011,322 | A | | 3/1977 | Rahtz et al. |
| 4,013,554 | A | * | 3/1977 | Reis et al. ...................... 210/670 |
| 4,014,777 | A | | 3/1977 | Brown |
| 4,038,592 | A | * | 7/1977 | Stummer ....................... 363/165 |
| 5,458,095 | A | * | 10/1995 | Post et al. .......................... 123/3 |
| 5,590,014 | A | * | 12/1996 | Bushman ....................... 361/225 |
| 5,844,249 | A | * | 12/1998 | Takano et al. ............... 356/237.1 |
| 6,248,221 | B1 | | 6/2001 | Davis |
| 6,884,326 | B2 | | 4/2005 | Futamura et al. |
| 7,033,470 | B2 | | 4/2006 | Mazanec et al. |

(Continued)

FOREIGN PATENT DOCUMENTS

| DE | 1809367 A | 6/1970 |
| DE | 1817719 A4 | 7/1970 |

(Continued)

OTHER PUBLICATIONS

Nölscher, Christoph, "Brennsgtoffzellen—Energiequelle für das 21. Jahrhundert?" Physik in unserer Ziet 27, pp. 52-59 (1996).

(Continued)

*Primary Examiner* — Paul Hyun
(74) *Attorney, Agent, or Firm* — Patent Central LLC; Stephan A. Pendorf

(57) ABSTRACT

A system and a method for cleaving water by means of hyperpolarization, the system has a first electrode and at least one additional electrode; at least one porous ferroelectric layer arranged between the first and the additional electrode; as well as an AC voltage or pulsed DC voltage source. With this method it is possible to cleave the water economically into hydrogen and oxygen and obtain gases for technical purposes.

18 Claims, 7 Drawing Sheets

(56) References Cited

U.S. PATENT DOCUMENTS

Figure 1:
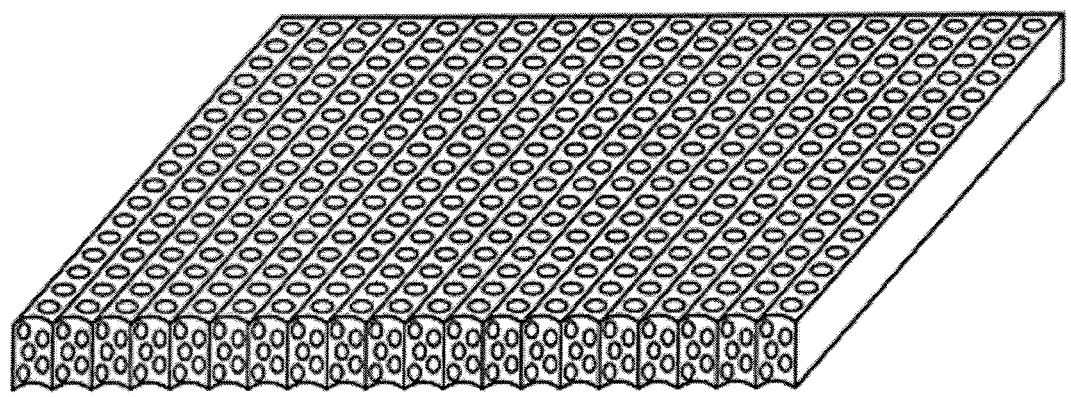

| | | |
|---|---|---|
| 2003/0079986 A1 | 5/2003 | Ikegawa |
| 2004/0195089 A1 | 10/2004 | O'Brien |
| 2007/0221496 A1 | 9/2007 | Bohnke et al. |

FOREIGN PATENT DOCUMENTS

| | | |
|---|---|---|
| DE | 1945568 A | 4/1971 |
| DE | 2436883 A1 | 2/1973 |
| DE | 2147312 A | 3/1973 |
| DE | 8111582 U1 | 11/1981 |
| DE | 8803441 U1 | 4/1988 |
| DE | 69026752 T2 | 11/1996 |
| DE | 102004038758 A1 | 5/2005 |
| GB | 1571315 | 7/1980 |
| JP | 01-115492 A | 5/1989 |
| JP | 2002-338203 A | 11/2002 |
| JP | 2003516216 A | 5/2003 |
| JP | 2004-217999 A | 8/2004 |
| JP | 2004-359508 A | 12/2004 |
| WO | 0127037 A1 | 4/2001 |
| WO | 2005/103336 A2 | 11/2005 |

OTHER PUBLICATIONS

Luz, Wolfgang-Dieter et al. "Die Zukunft der Elektrochemie", Chemie in unserer Ziet 23 pp. 151-160 (1989).

Inventor not named "Patentrecht" BGH 1997 Handhabungsgerät in GRUR 1998 pp. 130-132.

English translation of Japanese Office Action dated Dec. 27, 2011.

* cited by examiner

SYSTEM AND METHOD FOR SPLITTING WATER

CROSS-REFERENCE TO RELATED APPLICATIONS

This application is a National Stage Entry of PCT/EP2007/001425, filed Feb. 19, 2007, which claims priority from German Patent Application No. 10 2006 007 773.3, filed Feb. 20, 2006.

The present invention relates to a system for cleavage of water according to claim 1 as well as to a method for cleavage of water according to claim 12.

In view of the fact that oil and gas resources are running short and in view of the climatic problems with regard to the combustion of fossil fuels caused by the release of huge amounts of $CO_2$ by industry, private households and combustion engines, it is desirable to replace fossil fuels by more environmentally friendly energy containing systems.

On principle, the combustion of hydrogen with oxygen or air is suitable in this context, as the exhaust gas thereof essentially only consists of water vapour.

It is true that the explosive character of hydrogen in the presence of oxygen brings about problems in the use of hydrogen in combustion engines, however, most of the technical problems for a safe fuelling of vehicles have already been solved.

Munich airport, for example, runs a hydrogen station for filling hydrogen run buses which are used within the airport properties.

As this is possible within the high safety standards of an airport, it is to be assumed that the basic safety problems relating to filling vehicles with hydrogen have already been solved in practice.

Not solved up to now, however, is the energy-saving and environmentally-friendly production of hydrogen.

Hydrogen has been used commercially in many areas for more than 100 years. It is mainly used as synthesis gas by the chemical industry and semiconductor-, glass and metal industry and it is also used as rocket fuel. At present, about 500 to 600 billion cubic meters $H_2$ are needed.

Hydrogen is a colorless, odorless and tasteless light gas (it is about 14.4 times lighter than air, having a density of 0.8988 $kg/m^3$). It has a specific heating value of 10.8 $MJ/m^3$. Its melting point is 14.15 K and its boiling point is 20.35 K.

Hydrogen is a so called secondary energy carrier and not available in a molecular form as a pure substance but it only occurs in chemical compounds. The largest hydrogen storage on earth is water.

Thus, in order to use the energy of hydrogen, a lot of energy has to be spent in order to release it from its compounds. At present, hydrogen is mainly prepared from fossil energy carriers. Mostly, it is prepared by means of the so called steam reforming of natural gas. In earlier times, coal was gasified to prepare the so called "town gas", which was made of 60% hydrogen. Hydrogen furthermore is created as by-product of chemical processes such as in the preparation of chlorine, the dissolution of non-precious metals in acids, as well as in the course of refining in the petroleum industry.

However, as the conventional production methods of hydrogen bring about emissions which are harmful to the environment, it becomes more and more important to produce hydrogen by means of regenerative energy sources. One possibility is to produce hydrogen by means of biomass gasification.

Upon improvement of this method, it is possible to gasify all substances containing hydrocarbon, at least theoretically.

The disadvantage of this technology, however, is that not only hydrogen is created but also larger quantities of $CO_2$, which again is undesirable as it is a greenhouse gas.

Additionally, biological processes depend on temperature so that the yields obtained are variable. One concept to produce sensible amounts of hydrogen from the increasing amount of biomass is, for example, described in URL www-.bio-wasserstoff.de/h2/.

A further possibility to prepare hydrogen is the electrolysis of water, which preferably is highly ion containing, where an electric current is used in order to cleave the water molecules into hydrogen and oxygen. Here, the cathodic reduction of hydronium ions leads to the creation of molecular $H_2$ whereas anodically an oxidation of oxygen in hydroxide ions leads to the creation of molecular $O_2$. Both gases are then trapped separately, collected in storage vessels, purified and finally stored by means of compressors in pressure tanks, for example high pressure tanks or -bottles.

The present state of the art essentially is limited to the production of smaller amounts of hydrogen by the electrolysis of water, as the large scale production of hydrogen by means of electrolysis is relatively energy consuming because of various reasons such as the so called overvoltage phenomenon. DE 2 147 312, for example, discloses a micro autogenous welding apparatus. In DE 2 147 312 a device for the creation of a welding flame from oxyhydrogen gas by electrolysis of water using lye as an electrolyte in an reactor that is equipped with electrodes and has a feed and offtake tube, the device further exhibiting a transformator as well as a rectifier for the electric power supply of the electrodes and gas take-off pipe leading from the offtake tube to a burner, the gas pipe having, if applicable, non-return valves as well as filter and/or safety devices, wherein the electrodes have the form of plates or lamellae.

However, such an electrolysis device is only suitable for providing small amounts of hydrogen gas.

Additionally, DE 1 817 719 describes ceramic diaphragmas for so called electro kinetic devices in which liquids are pumped into porous carriers, in particular ceramics, hereby causing a charge separation so that an electrical voltage can be tapped like with an electrokinetical generator.

With respect to the above mentioned state of the art, it is the object of the present invention to provide an electrochemical system as well as method for providing a sufficient amount of hydrogen from water by cleaving water in a cost-effective way and, possibly, without having to use oil resources.

Regarding the apparatus, this object is solved by the features of claim 1.

With respect to the method, this object is solved according to the features of claim 12.

The dependent claims represent preferred embodiments of the present invention.

It is the object of the present invention to improve the efficiency of water cleavage in comparison to the conventional electrolysis method by means of continuous current and metal electrodes. The efficiency achieved with conventional methods is only 20% at the most. It is the object of the present invention, however, to achieve an efficiency of more than 90%, and, finally, a new reactor module able to run a generator of 1 kilowatt is to be prepared by the present invention. The aim is to provide a considerably smaller and more manageable system. The method according to the present invention can be modified for further application, in particular for the preparation of fuels and synthesis gases.

The hydrogen prepared using the present invention can be used in combustion systems in which fossil energy carriers have been used up to now. Of course, it can also be used to run electrochemical $H_2/O_2$ fuel cells for power generation.

In particular, it is the aim of the present invention to provide a so called gradient material instead of a simple metal electrode and to optimize the electrical stimulation of the electrocatalytic method of the present invention.

The method according to the present invention (grading of the materials, properties of the circuit) bases on the following theoretical principles, without being limited to them:

Principle I:

The grading (increasing layer by layer) of the dielectric constant may permit the use of electric dispersion effects. If the dielectric constant increases in passage direction and the thickness of the membrane layers decreases, the stimulation process can even control itself layer by layer, when the stimulation frequency increases (remaining within a suitable spectrum).

Principle II:

In case of grading of the porosity (pore number and size) the water in the membrane layers may experience an increasing dispersion (limited by capillary effects). If the interior membrane surfaces are as big as possible, this leads to correspondingly high dissociation rates.

Principle III:

The inventor already developed corresponding circuits where no idle power occurs (described in the framework of the present invention). These circuits may also be applied in this case.

Principle IV:

The method according to the present invention is not an electrolysis as conventionally defined but a "hyperpolarisation" of molecular water dipoles by means of electrical fields. Here, there are hardly any electron currents (redox processes at electrodes) flowing. The charges on the ceramics used are predominantly stationary. If the water passes through layers having a permittivity >81 (i.e. the one of $H_2O$) the water disintegrates (hyperpolarisation). Stable hydrogen bonds form a net, partially dissociated water forms gas in the pores as reaction spaces. Because of the at least partially nanopolar huge inner surface, the dispersion of the solved active ingredients can be improved, for example for pharmaceutical purposes.

The present system was tested on a laboratory scale. The water cleavage by means of electrodes and intermediate ceramic layers and the electrical stimulation, as explained in more detail below, works. Therefore, the invention can be carried out.

The production and application of graded ceramic membranes as used in the present invention, in reactors for the production of hydrogen from water, are a key technology. It is highly likely that it allows the development of new chemical reactors for the use, for example, in chemistry of complexes up to the construction of operating sources for motors and generators on the basis of water. This was tested by means of a two-strike engine.

The invention is especially important in view of the temperatures of the summer of 2003 which at that time already hinted to a rapid global climate change, as the new membrane technology brings about the possibility to prepare hydrogen in an ecologically friendly and economically sensible way, which could be the solution of important ecological and economic problems.

The hydrogen fraction from a $H_2/O_2$ mixture, wherein the hydrogen for example can be separated passively, then can seriously compete with other fuels for ground vehicles, aircrafts and spacecrafts.

In the framework of the present invention, optimized methods for the production of hydrogen are provided. In the past, there were extensive and intensive efforts taken to develop energy- and drive technologies on the basis of hydrogen as energy carrier.

Some of the technologies that are almost fully developed, such as the fuel cell or the hydrogen engine, unfortunately have little chance to establish across the board. In this context, the production of hydrogen has been to expensive up to now. However, this is supposed to change by the present invention:

However, a new kind of ceramic based reactor, which considerably improves the efficiency of hydrogen production, can help to overcome this discrepancy. It is highly likely that technologies that are needed for environmental purposes can overcome economic obstacles much faster and can soon be used on a large scale.

Furthermore, as explained in the introductory part, there is a great demand for hydrogen as chemical base material.

The present invention provides a concept for a new type of reactor. The experiments carried out so far are very promising. According to the first tests, the reactor is not only suitable for electrochemically cleaving water but can also be modified for other chemical and physical purposes. Therefore, it represents a real basis and key technology, respectively.

It is the core of the invention to use membranes and membrane stacks of any dimension and form being ferroelectric and at the same time porous in the systems of the present invention. Such membranes and membrane staples of the above-mentioned kind exhibit the following characteristics:

1. Membranes and/or membrane staples made of organic and/or inorganic materials are both ferroelectric and porous.

They also exhibit a grading of the dielectric constant of the membrane layers for using electric dispersion effects. Additionally, the dielectric constant seen in the passage direction of a medium increases if the thickness of the individual porous membrane layers decreases (grading of the layer thickness).

The grading of the porosity (i.e. the number and size of the pores) in the membrane layers in passage direction of the reaction medium leads to an increasing dispersion and the creation of an inner reaction surface that is as large as possible.

Thanks to the production and the use of graded membranes with ferroelectric and simultaneously porous characteristics, new chemical and/or physical reactors as well as filters can be developed.

Gas generators are examples for main areas of use of graded membranes with ferroelectric and simultaneously porous characteristics.

By means of the present invention, the efficiency of conventional $H_2$-gas generators can be increased by the so called LORENTZ fields in the pores of ferroelectric membranes according to the present invention which restrict heat movement of the water movement and prepolarize the molecules and the OH stretching vibration, respectively, until the OH bond breaks. The membranes of the present invention can be used in the cleavage of water to obtain technical gases.

Further advantages and features of the present invention will become apparent from the description of working examples as well as from the drawing.

Figure 2:
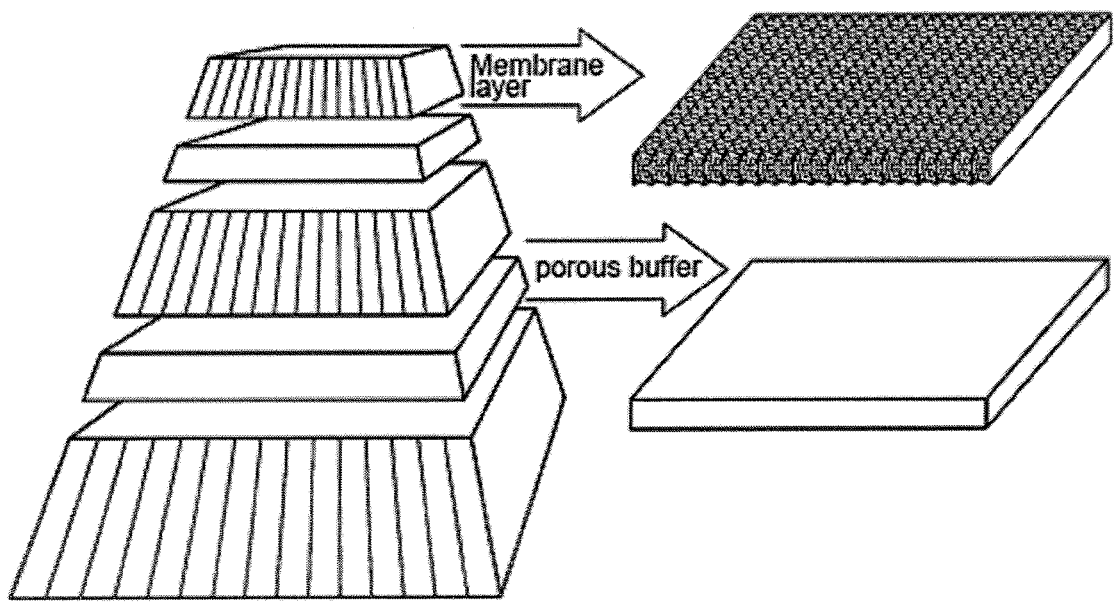
Figure 3:
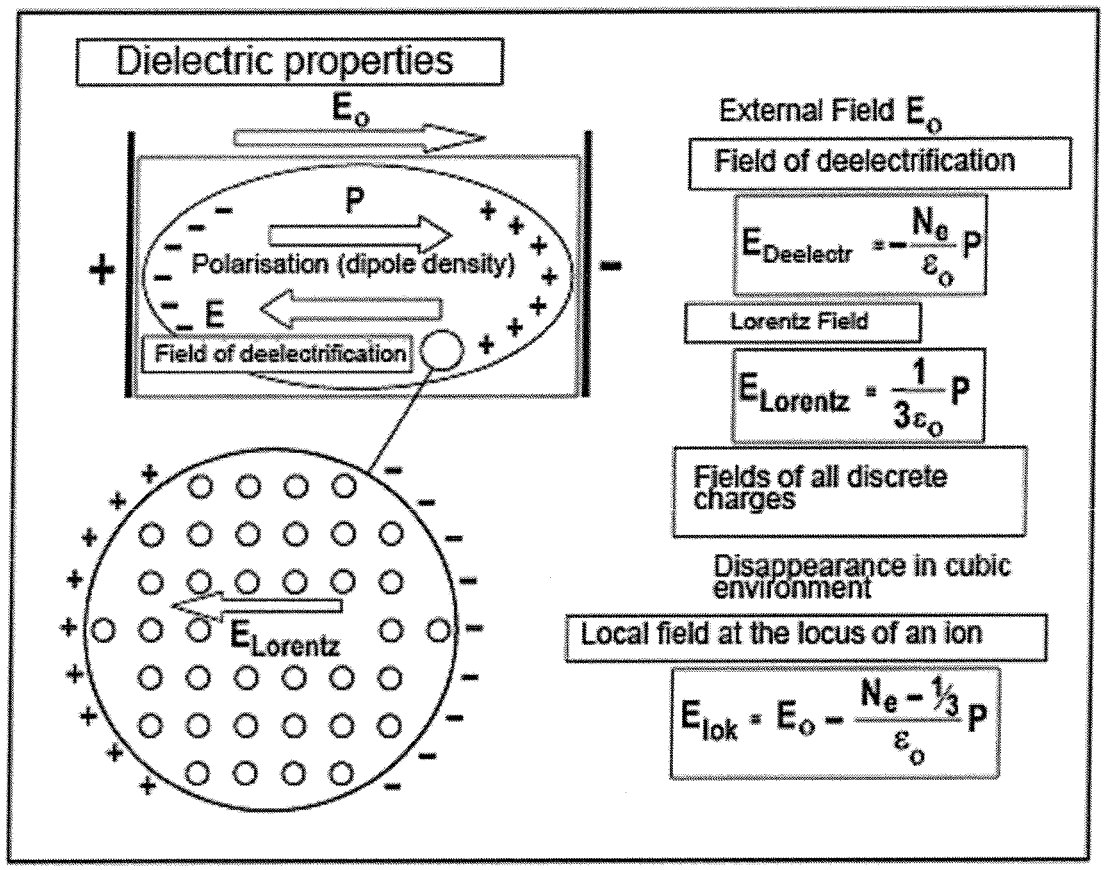
Figure 4:
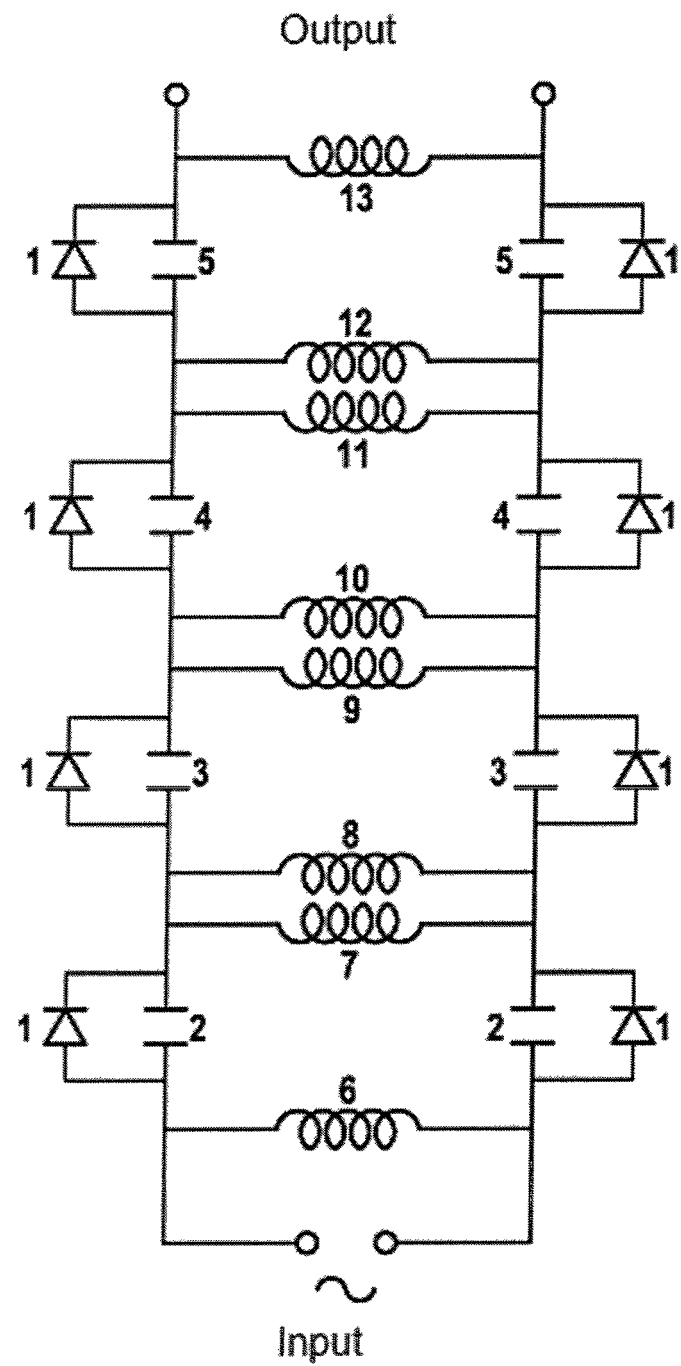
Figure 5:
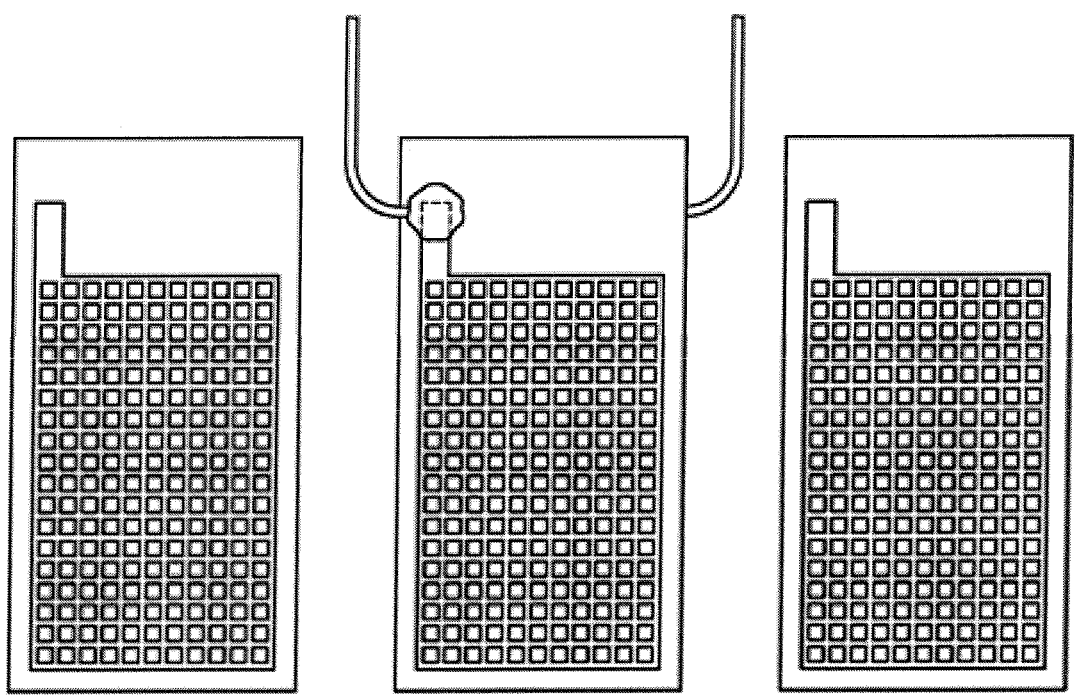
Figure 6:
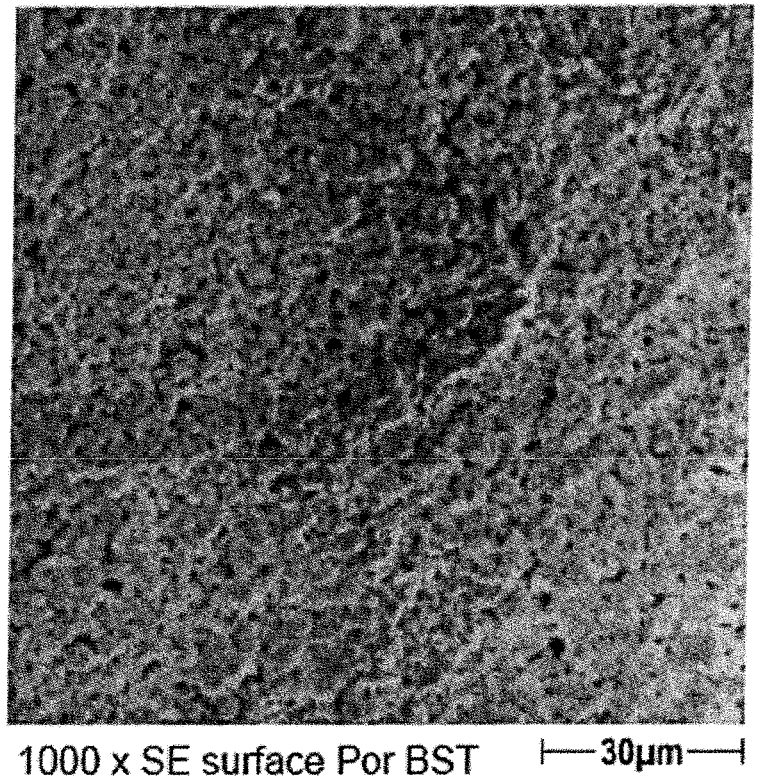
Figure 7:
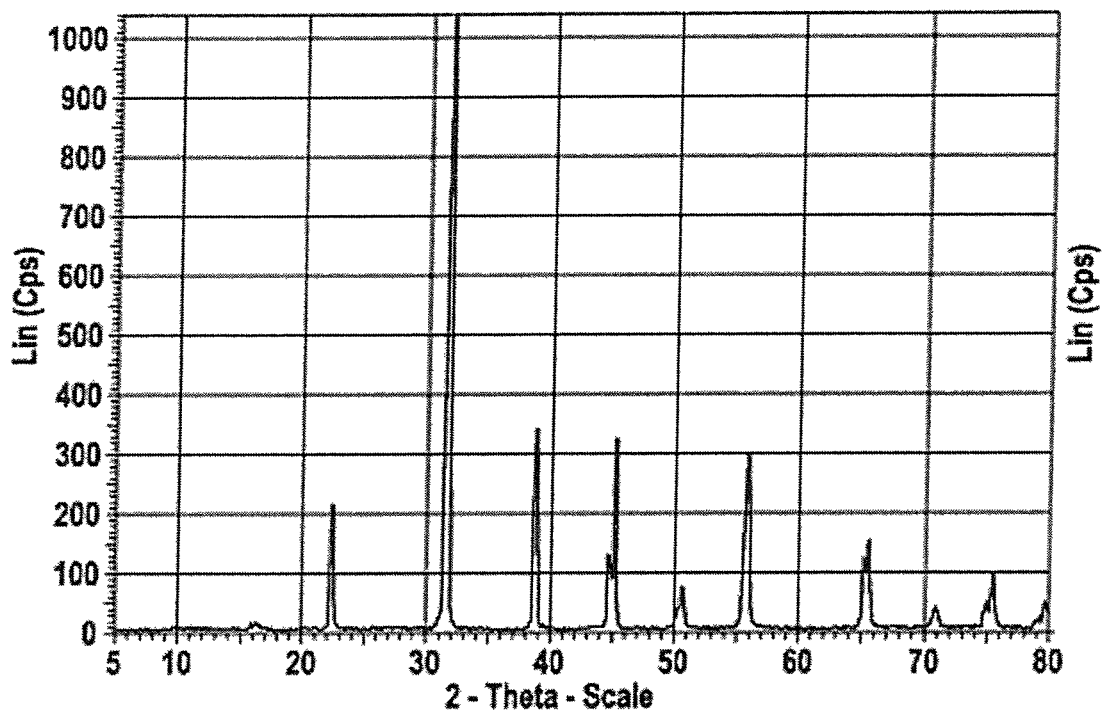
Figure 8:
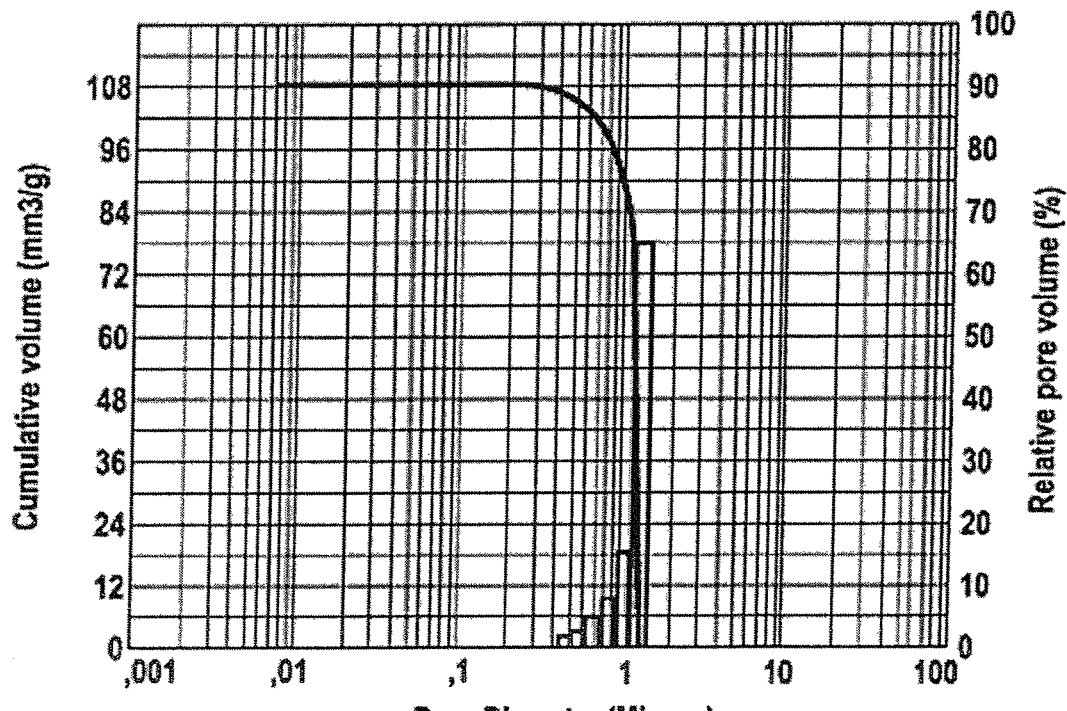
Figure 9:
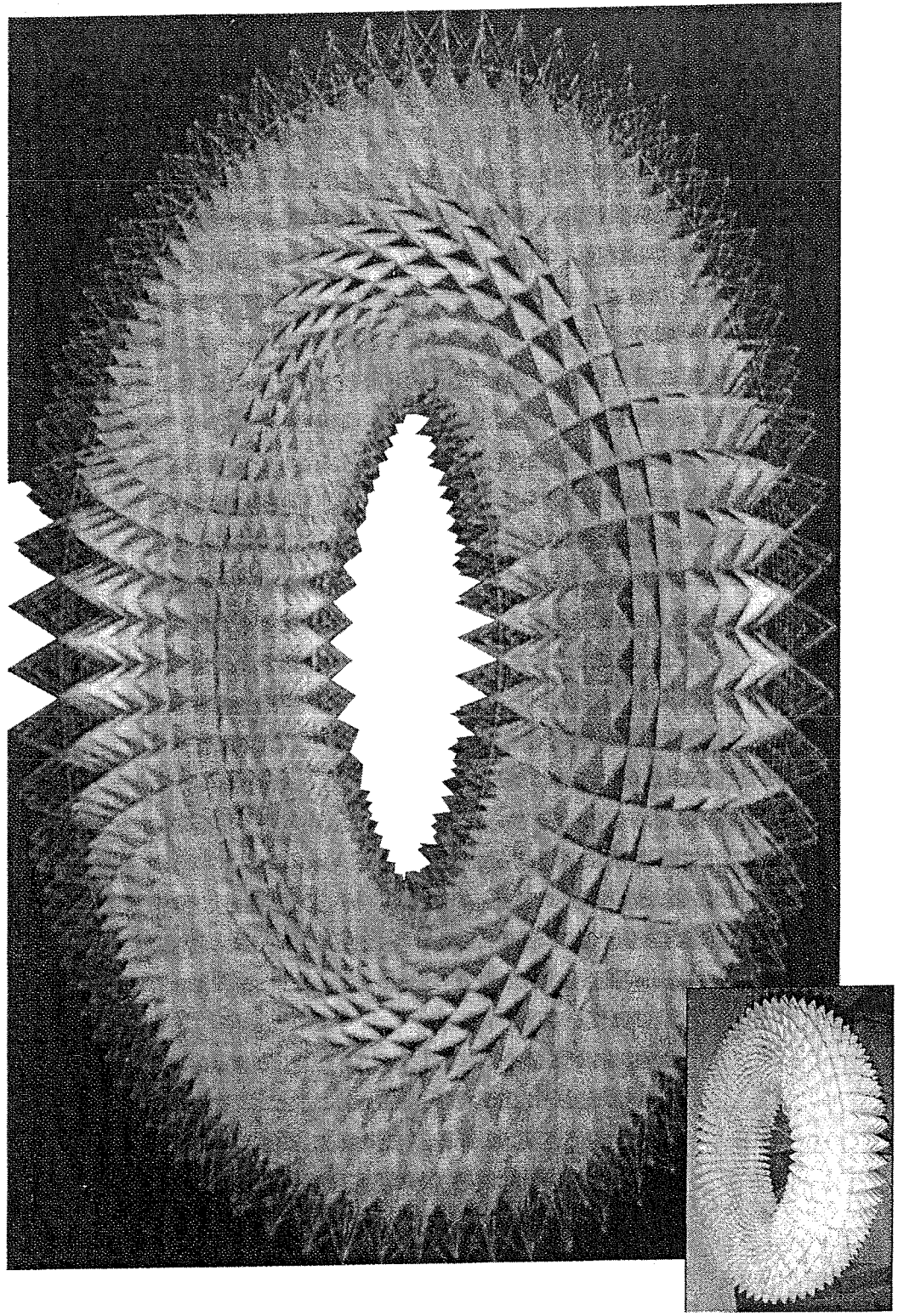

It shows:

FIG. 1 the basic structure of a membrane having ferroelectric and porous characteristics;

FIG. 2 the basic structure of a composite of stacked ferroelectric membranes, here in the form of a truncated octahedron, with decreasing thickness of the layer in direction of the summit arranged in rising dielectric constant and porosity;

FIG. 3 a scheme of the electrical fields in a nanopore;

FIG. 4 a filter circuit for producing resonance frequencies;

FIG. 5 sintered ceramic plates with grid electrodes made of molybdenum, aluminium and gold;

FIG. 6 a scanning electron micrograph of the porous ferroelectric ceramic surface used according to the present invention;

FIG. 7 is a X-ray diffraction diagram of a barium titanium oxide used according to the present invention;

FIG. 8 a pore size distribution curve of the porous ferroelectric ceramic used according to the present invention;

FIG. 9 a toroid shaped embodiment of the porous ferroelectric ceramic layer used according to the present invention.

Exemplary production of porous ferroelectric ceramic plates for the use in the systems of the present invention that can be used as water cleavage reactor.

1. Powder Preparation

Using the ceramic mixture oxide technology, two powder charges of modified barium titanate with a molar composition of 95 mole percent barium titanate and 5 mole percent strontium titanate were prepared on a laboratory scale using oxidic raw powder. After heat treatment of the raw powder mixtures (calcination), a pure tetragonal perowskit structure is obtained (cp. X-ray diffraction pattern according to FIG. 7). The X-ray reflexes are between the compounds barium titanate and 40% barium strontium titanate registered in the ASTM register. After milling in a drum mill, there is a powder available for extrusion, having a fineness of 90 mass percent, smaller than 10 µm.

2. Forming and Sintering

Suitable binders, lubricants and water retention agents are added to the powder in a laboratory Brabender Mixer for preparing a stiff but plastic extrudable mass. It became clear that it is necessary to amend the plastification recipe for the special powder composition. A Brabender vacuum screw extruder with a specially designed extruding tool was used to prepare stripe-shaped ceramic preforms having a cross section of 1.3×28 mm from this stiff but plastic mass.

The preforms were sintered after careful thermal decomposition of the organic adjuvants at 1220° C. in an oxidizing atmosphere. The lateral shrinkage amounts to approx. 3%.

3. Metallization

Metallization for applying the electrodes was realized by a screen printing process. A printing screen having a suitable grid electrode structure was tested. On an electrode area, there are 209 recesses having 1×1 mm and spaced apart in a distance of 1 mm. Pretests were carried out by screen printing pastes with silver, gold, aluminium, copper and molybdenum as main components. Silver is not suitable due to migration occurring in the electrolyte in the case of direct voltage. Copper can only be baked on in a reducing way and does not adhere to the barium titanate ceramic after a reducing baking. Thus, in particular grid electrodes made of gold, aluminium and molybdenum are suitable for the purposes of the present invention.

FIG. 5 shows samples of the ceramic layers with grid electrodes made of gold, aluminium and molybdenum, respectively. Tests showed that all three metals are suitable for the purposes of the present invention, however, gold is the most suitable.

4. Characterization of the Ceramic Material

For the preliminary characterization of the ceramic material, the open porosity and the dielectric behaviour were examined.

With approx. 38%, the open porosity lies in the desired range. According to the results of the mercury porosimetry, the pore size distribution (cp. FIG. 8) lies 95% in a narrow range between 700 nm and 1500 nm.

The scanning electron microscopy of the surface of the sintered ceramic (cp. FIG. 6) shows that the sintering, as aimed, does not exceed the early stage, the formation of so called sinter necks in the grains. The emphasized grain growth normally typical for barium titanate does not occur as well.

First measurements of the sample capacity resulted in values of C=3.5 nF and tand=0.01, corresponding to a relative dielectric constant of about 730. Measurements with high voltage were limited for device-related reasons to 1500 V at first. Here, a saturation of the dielectric hysteresis does not yet occur. Especially large surfaces are obtained if the barium titanate ceramic is toroid shaped, as shown in FIG. 9.

The present invention can be used for the commercial production of hydrogen and oxygen using porous ferroelectric ceramic systems in systems that can be used as water cleavage reactor.

The porous ferroelectric layers prepared in the embodiment and shown in FIGS. 5 and 6, in the example ceramic layers, are immersed in a 1% NaOH solution and provided with an AC voltage or pulsed DC voltage source by means of a filter circuit according to FIG. 4.

The electronic filter circuit, below referred to as ZIM-ZUM, described by way of example in the following, is suitable for operation with AC voltage.

An electronic ZIM-ZUM circuit is characterized by the combination of the following constructional features and properties:

Capacitors 2, 3, 4, 5 are connected in series. Diodes 1 are connected in parallel to the capacitors, as shown in FIG. 4. Moreover, the circuit according to the present invention exhibits inductivities as open field coils, shown as 6, 7, 8, 9, 10, 11, 12 and 13 in FIG. 4 and connected in parallel, as shown in FIG. 4.

AC voltage is supplied to the input side of the complete circuit, wherein according to FIG. 4 a high-frequency AC voltage having a frequency in the mega- to gigahertz range is present at the output side of the circuit.

The components of the circuit according to FIG. 5 form an amplification stage or a multistage cascade with amplifying effect. The cascade works with an efficiency of more than 90%.

The ZIM-ZUM circuit is a cascade circuit and exhibits several resonance frequencies. It exhibits a so called return flow attenuation. In this circuit, current and voltage are nearly in phase. This leads to the fact that the ZIM-ZUM circuit has an efficiency of more than 90%, as barely and idle power occurs. As a mechanical analogy, a water pump, which has two side arms, with alternating water output is usable. Analogously, the diodes have the function to act like pump valves against a water reflux. The system of the coils according to FIG. 4 creates inhomogenous magnetic alternating fields. The highest magnetic field strengths in the field coils in concept and reality occur at the circuit output.

Thus, a mechanical analogy to explain this is a water pump with two side arms wherein the arms are alternatingly operated. The pump is composed of individual modules. Overvoltage, i.e. the pressure difference at the capacitors, increases strongly in the direction of the output. Regarding changing the flux: First of all, the cross-section of the tube is reduced in the two medium modules. From the medium modules in direction to the exit, the tube cross-section is highly increased, this even increasing the so called pull. The ZIM- ZUM circuit, in particular, acts as multi stage amplifier. Due to the diodes connected in parallel to the capacitors, it exhibits a so called return flow attentuation. The circuit shown in FIG. 4 can be used in all systems where a in-phase input of current and voltage is important.

An exemplary effect of the circuit according to FIG. 4 is shown in the following:
- 1 shows diodes of the type 1N4007
- 2 shows capacitors having a capacity of 100 nF
- 3 shows capacitors having a capacity of 47 nF
- 4 shows capacitors having a capacity of 33 nF
- 5 shows capacitors having a capacity of 10 nF
- 6 shows an inductance with 3.3 mH
- 7 shows an inductance with 3.3 mH
- 8 shows an inductance with 2.2 mH
- 9 shows an inductance with 2.2 mH
- 10 shows an inductance with 1 mH
- 11 shows an inductance with 1 mH
- 12 shows an inductance with 4.7 mH
- 13 shows an inductance with 4.7 mH In contrast to the state of the art, the method according to the present invention is not an electrolysator but a so called hyperpolarisator. This means that water is created on a molecular level and via short living intermediate radicals, respectively, and not via protons and hydroxide ions and via current transport. However, the cleavage of water dipoles takes place by means of the system of the invention because of a "bias voltage" by permanent electrical fields in the nanopores, i.e. the so called LORENTZ fields as for example shown in FIG. 3, in combination with the entered electromagnetic impulse. Thus, water molecules can mainly be split by field and resonance effects and not, as described in the prior art, by current flow.

Gas fractions are created moving in opposed directions in the ceramic membrane.

By the parallel orientation of the electrical fields in the pores, the movement of the heat and water molecules is limited and the OH stretching vibration by field and resonance effects is increased.

For the purposes of the present invention, it turned out that the described porous, in particular nanoporous and ferroelectric layer or membrane is necessary in order to be able to dissolve the water cluster more or less mechanically. As the cluster in the pores dissolve, the water already enters the gas phase at about 30° C.

The used ferroelectric ceramic plate soaks if it is covered to one third in 1% sodium hydroxide solution. Thus, it is wettable and creates a capillary suction vortex.

Moreover, an AC voltage or a pulsed DC voltage have to apply in order to increase the field and resonance effects within the inner surface of the porous ferroelectric layer and finally cleave the water.

$H_2/O_2$ is separated—if necessary—by means of known methods such as fractionated distillation, membrane separation or capturing the $H_2$ as metal hydride.

By means of the present invention it was possible to produce in a volume of approx. 200 ml from 300 to 500 ml hydrogen per hour in a laboratory scale in a KOH electrolyte.

Only minimum energy is necessary for the filter circuit. Therefore, the present invention for the first time provides an economic method for the production of a sufficient amount of hydrogen from water in an environmentally unobjectionable way.

The method is even more environmentally friendly if AC voltage originating from solar energy is applied to the filter circuit.

The invention claimed is:

1. A system for cleaving water comprising:
   a. a first electrode and at least one additional electrode;
   b. a volume of water;
   c. at least one porous ferroelectric layer immersed at least partially in the water and arranged between the first and the additional electrode; and
   d. an AC voltage source connected to apply an AC voltage between the first electrode and the additional electrode(s).

2. The system according to claim 1, wherein the electrodes are grid electrodes.

3. The system according to claim 1, wherein the electrodes are stainless steel; precious metals; palladium and alloys thereof; electrically conductive ceramic; or electrically conductive polymers.

4. The system according to claim 3, wherein the stainless steel is V2A or V4A.

5. The system according to claim 1, wherein the porous ferroelectric layer is formed from at least one material, selected from the group consisting of: organic ferroelectrics and inorganic ferroelectrics; as well as mixtures thereof.

6. The system according to claim 5, wherein the organic ferroelectrics are electrets, cyclohexane-1,1'-diacetic acid, or triglycine sulphate, and wherein said inorganic ferroelectrics are ceramic ferroelectrics.

7. The system according to claim 6, wherein the electrets are halogenated hydrocarbons, and wherein the ceramic ferroelectrics are ion crystals with perowskit structure.

8. The system according to claim 7, wherein the halogenated hydrocarbon is tetrafluoroethylene, and wherein ion crystals with perowskit structure are barium titanate, strontium titanate, lead zirkonate titanate, strontium bismuth tantalate, bismuth titanate, bismuth lanthane titanate, or bismuth titanate niobate.

9. The system according to claim 6, wherein the ceramic ferroelectrics additionally contain non-ferroelectric additives.

10. The system according to claim 1, wherein the AC voltage source is a frequency generator.

11. The system according to claim 10, wherein the AC voltage exhibits a frequency in the mega to gigahertz range.

12. The system according to claim 10, wherein a filter circuit is provided between the frequency generator and system.

13. A system for cleaving water comprising:
   a. a first electrode and at least one additional electrode;
   b. a volume of water;
   c. at least one porous ferroelectric layer immersed at least partially in the water arranged between the first and the additional electrode; and
   d. an AC voltage source connected to apply an AC voltage between the first electrode and the additional electrode(s),
   wherein the AC voltage source is a frequency generator,
   wherein a filter circuit is provided between the frequency generator and system, and
   wherein the filter circuit is a ZIM-ZUM circuit comprising capacitors connected in series, diodes connected in parallel to the capacitors, and open field coils connected in parallel.

14. The system according to claim 1, wherein the porous ferroelectric layer is octahedron shaped.

15. The system according to claim 1, wherein the porous ferroelectric layer is formed as cylinder, truncated cone or complex toroid.

16. A method for cleaving water, comprising
(a) immersing at least a part of a porous ferroelectric layer of a system for cleaving water in water comprising:
a first electrode and at least one additional electrode;
at least one porous ferroelectric layer arranged between the first and the additional electrode; and
an AC voltage source;
(b) applying an AC voltage to the electrodes of the system, wherein water is cleaved in the system essentially into hydrogen gas and oxygen gas; and
(c) removing the created gas.

17. The method according to claim 16, further comprising using the created gas as fuel gas in a combined heat and power plant or in a combustion engine or as technical gas mixtures.

18. The method according to claim 16, further comprising separating the gases into oxygen and hydrogen.

* * * * *